United States Patent [19]

Isegawa et al.

[11] Patent Number: 5,114,521
[45] Date of Patent: May 19, 1992

[54] METHOD FOR PRODUCING A SLIDING COUPLING BY A MONOMER CASTING METHOD

[75] Inventors: Yo Isegawa; Takeshi Kito, both of Yokkaichi; Kimimasa Muryayama, Toyota; Shoji Ikawa, Toyota; Takahiro Iwase, Toyota; Tutomu Sugiura, Toyota; Atsuyuki Tsuzuki, Toyota, all of Japan

[73] Assignees: Mitsubishi Monsanto Chemical Company, Tokyo; Toyota Jidosha Kabushiki Kaisha, Toyota, both of Japan

[21] Appl. No.: 505,990

[22] Filed: Apr. 6, 1990

[30] Foreign Application Priority Data

Apr. 10, 1989 [JP] Japan .................................. 1-88033
Jul. 6, 1989 [JP] Japan .................................. 1-173030

[51] Int. Cl.$^5$ .............................................. B29C 39/02
[52] U.S. Cl. ...................................... 156/242; 156/293;
156/294; 29/895.32; 29/898; 29/898.06;
29/898.12; 29/898.047; 285/261; 285/291;
528/315; 528/323; 528/325; 528/326;
264/328.1; 264/328.2; 264/328.6; 264/328.14;
264/DIG. 56
[58] Field of Search ............... 156/242, 245, 293, 294;
264/328.1, 328.2, 328.6, 328.14, DIG. 56;
29/898, 895.32, 898.044, 898.06, 898.12,
898.043, 898.046, 898.047, 898.051, 898.058,
898.059; 285/261, 291; 528/315, 325, 323, 326

[56] References Cited

U.S. PATENT DOCUMENTS

| | | | |
|---|---|---|---|
| 3,202,249 | 8/1965 | White | 29/898.047 |
| 4,420,354 | 12/1983 | Gougeon et al. | 264/328.6 |
| 4,496,514 | 1/1985 | Yang et al. | 264/328.6 |
| 4,677,189 | 6/1987 | Mottus | 528/323 |
| 4,695,611 | 9/1987 | Mottus | 525/432 |
| 4,885,125 | 12/1989 | Kato et al. | 264/328.6 |
| 4,908,922 | 3/1990 | Abe | 29/898.12 |

FOREIGN PATENT DOCUMENTS 60-178013  9/1985  Japan .
63-212518  9/1988  Japan .

*Primary Examiner*—Caleb Weston
*Attorney, Agent, or Firm*—Oblon, Spivak, McClelland, Maier & Neustadt

[57] ABSTRACT

A method for producing a sliding coupling, which comprises injecting a casting material comprising the following components (A) and (B) into a clearance between a bearing and a shaft fitted in and rotatably or reciprocatively supported by the bearing, wherein a primer is preliminarily applied to either the shaft or the bearing and a releasing agent is preliminarily applied to the other; followed by polymerization and curing to form a resin lining on the surface of the shaft or the bearing:

(A) a Ω-lactam liquid containing a polymerization catalyst of an alkali metal or alkaline earth metal compound; and
(B) a Ω-lactam liquid containing at least one polymerization initiator.

9 Claims, 1 Drawing Sheet

METHOD FOR PRODUCING A SLIDING COUPLING BY A MONOMER CASTING METHOD

The present invention relates to a sliding coupling comprising mutually fitting shaft and bearing therefor, such as a journal and a journal bearing, or a spline shaft and its bearing. More particularly, the present invention relates to a method for producing a sliding coupling wherein a resin lining is formed on the surface of the shaft or the bearing by a monomer casting method.

Japanese Unexamined Patent Publication No. 178013/1985 discloses a so-called in-situ processing wherein a low viscosity monomer or prepolymer is injected into a clearance between a shaft and a bearing, followed by polymerization and curing to form a resin lining on the surface of the bearing. As the monomer or prepolymer, caprolactam, a lactam anion and an acyl lactam are disclosed, but no specific monomers are disclosed.

On the other hand, Japanese Unexamined Patent Publication No. 212518/1988 discloses the following polymerization initiators as examples of the monomers to be used for the in-situ processing method.

In the above formulas, A is a halogen atom or wherein Y is a $C_3$-$C_{11}$ alkylene group, a is an integer of 1, 2 or 3, b is an integer of 2 or more, $R_1$ is an alkylene group, an aralkyl group, an alkyloxy group, an aryloxy group, a halogen atom or an aralkyloxy group, $R_2$ is a bivalent or higher valent group selected from the group consisting of a hydrocarbon group and an hydrocarbon group having an ether linkage, and Z is (1) a polyether having a molecular weight of at least about 2,000, (2) a polyester segment having a polyether segment having a molecular weight of at least about 2,000, or (3) a hydrocarbon group having a molecular weight of at least 1,000.

However, Japanese Unexamined Patent Publication No. 212518/1988 does not disclose or suggest that the problem of the present invention can be solved by using a specific polypropylene oxide polyol.

Japanese Unexamined Patent Publication No. 86723/1988 discloses a lactam polymerization initiator containing an elastomeric backbone derived from a telechelic polyamine containing at least two primary or secondary amino groups and at least two lactam terminal groups represented by the formula:

wherein Q is a lactam residue having a $C_3$-$C_{11}$ alkylene group, said lactam residue being bonded to carbonyl via its nitrogen atom; A is an aliphatic or aromatic hydrocarbyl group or hydrocarbyl ether group; m is 0 or 1; when m is 0, n is 0 or 1, and p is 1; and when m is 1, n is within a range of from 1 to 3, and p=n. However, the publication does not disclose or suggest that such a lactam polymerization initiator can be used for the in-situ processing method, and the problem of the present invention can thereby solved.

The sliding coupling obtained by applying a resin lining by the monomer casting method, is used by injecting a grease into a clearance between the shaft and the bearing having the resin lining formed thereon.

Sliding couplings obtained by the above-mentioned conventional methods had a drawback that when they are used at a high temperature (at least 100° C.) with a commonly employed grease injected therein, the lined polyamide resin is likely to undergo a deterioration. If the deterioration of the resin progresses, cracking is likely to take place in the polyamide resin, and peeling of the resin from the bearing surface is likely to result. Therefore, at sites where the above sliding coupling is applied, there will be an increase of the vibration sound and an increase of the sliding resistance during the sliding operation.

The present invention is intended to solve such problems. An object of the present invention is to provide a method for producing a sliding coupling which is excellent in the durability and which is capable of preventing a deterioration of the polyamide resin or a decrease in the bonding strength with the metal interface even in a high temperature atmosphere under a condition where a grease is present, by selecting the polymerization catalyst and the polymerization initiator used in the lining of a polyamide resin.

The present invention provides a method for producing a sliding coupling, which comprises injecting a casting material comprising the following components (A) and (B) into a clearance between a bearing and a shaft fitted in and rotatably or reciprocatively supported by the bearing, followed by polymerization and curing to form a resin lining on the surface of the shaft or the bearing:

(A) a Ω-lactam liquid containing a polymerization catalyst of an alkali metal or alkaline earth metal compound; and (B) a Ω-lactam liquid containing at least one polymerization initiator selected from the group consisting of a polyoxyalkylene, an oxyalkylene copolymer, a polyalkadiene, an alkadiene copolymer, a polyalkene and an alkene copolymer, each of which has at least two terminal groups selected from the group consisting of lactam terminal groups of the following formulae:

wherein Q is a lactam residue having a $C_3$–$C_{11}$ alkylene group, said lactam residue being bonded to C, P or S via its nitrogen atom; A is an aliphatic or aromatic hydrocarbon group, or a hydrocarbon group having an ether linkage; m is 0 or 1; when m is 0, n is 0 or 1, and p is 1; when m is 1, n is within a range of from 1 to 3, and p=n; $R_1$ is an alkyl group, an aralkyl group, an alkoxy group, an aryloxy group, a halogen atom or an aralkyloxy group; and $R_2$ is a hydrogen atom or an alkyl group; or at least one polymerization initiator selected from the group consisting of lactam initiators of the following formulae;

wherein Z is a polypropylene oxide polyol, t is at least 1, and Q, A, m, n and p are as defined above.

In the accompanying drawings.

Now, the present invention will be described in further detail with reference to the preferred embodiments.

The sliding coupling of the present invention is the one obtained in such a manner that firstly a shaft such as a round shaft or an angular shaft is fitted in and rotatably or axially reciprocatively supported by a suitable bearing (here, the bearing includes not only an independent of separate bearing but also a bearing portion integral with the main body of a machine), then a $\Omega$-lactam solution containing a prescribed amount of a polymerization catalyst of an alkali or alkaline earth metal compound i.e. a casting material (A), and a $\Omega$-lactam solution containing a polymerization initiator i.e. a casting material (B), are mixed and stirred to obtain a low viscosity solution, the low viscosity solution is injected into a clearance between the shaft and the bearing, or a suitable amount of such a solution is firstly poured into the inner space of the bearing and then the shaft is fitted into the bearing to uniformly spread the solution throughout the clearance, followed by heating for polymerization and curing to form a resin lining on the surface of the shaft or the bearing. Namely the sliding coupling is obtained by an in-situ processing wherein a resin lining is formed directly to a clearance between the shaft and the bearing which are already fitted or assembled. In such a case, it is difficult to remove the resin lining after the polymerization. It is therefore advisable to preliminarily apply a suitable sealing to the bearing except for the portion (the bearing surface) which is desired to have a bearing function. Further, in order to let the polymerization reaction proceed uniformly and smoothly, it is advisable to preheat the shaft and the bearing prior to the injection of the solution to a temperature suitable for the polymerization, as the case requires. Further, prior to the injection of the solution, a suitable primer may be applied to the bearing surface of the bearing and a suitable releasing agent may be coated to the shaft, so that the resin lining will be firmly fixed to the bearing surface. When it is desired to apply the resin lining on the shaft, the primer may be applied to the shaft, and the releasing agent may be applied to the bearing.

Now, the present invention will be described in further detail.

$\Omega$-lactam

The $\Omega$-caprolactam to be used in the present invention includes, for example, $\gamma$-butyrolactam, $\delta$-valerolactam, $\epsilon$-caprolactam, $\Omega$-enantholactam, $\Omega$-capryllactam, $\Omega$-undecanolactam and $\Omega$-laurolactam. These $\Omega$-lactams may be used alone or in combination as a mixture of two or more.

Polymerization Catalyst

The polymerization catalyst of an alkali metal or alkaline earth metal compound contained in the casting material (A) to be used in the present invention, may be selected from those commonly used in conventional anion polymerizations of $\Omega$-lactams. Specific examples of such a polymerization catalyst include an alkali metal, an alkaline earth metal, their hydrides, oxides, hydroxides, carbonates, alkyl compounds, aryl compound, alkoxides and Grignard compounds, and reaction products of such metals or metal compounds with $\Omega$-lactams, such as sodium salts, potassium salts and magnesium halides of $\Omega$-lactams. The alkali polymerization catalyst is used in an amount within a range of from 0.01 to 15 mol %, or 20 mol % or more, relative to the total $\Omega$-lactams.

Polymerization Initiator

The lactam polymerization initiator of the present invention includes the one containing an elastomeric backbone derived from a telechelic polyamine containing at least two primary or secondary amino groups and at least two lactam terminal groups represented by the following formulae:

wherein Q is a lactam residue having a $C_3$–$C_{11}$ alkylene group, said lactam residue being bonded to C, P or S via its nitrogen atom; A is an aliphatic or aromatic hydrocarbon group, or a hydrocarbon group having an ether linkage; m is 0 or 1; when m is 0, n is 0 or 1, and p is 1; when m is 1, n is within a range of from 1 to 3, and p=n; $R_1$ is an alkyl group, an aralkyl group, an alkoxy group, an aryloxy group, a halogen atom or an aralkyloxy group; and $R_2$ is a hydrogen atom or an alkyl group.

More specifically, this initiator is represented by the formula:

wherein Z is a polyvalent group derived from a telechelic polyamine selected from the group consisting of a polyoxyalkylene polyamine, an oxyalkylene copolymer polyamine, a polyalkadiene polyamine, an alkadiene copolymer polyamine, a polyalkene polyamine, an alkene copolymer polyamine and a combination thereof; t is at least 1, and A, Q, m, n, $R_1$ and p are as defined above.

This initiator can be formed by the reaction of an acyllactam monomer having acyl groups with a telechelic polyamine.

According to the method of the present invention, it is possible to obtain a polyamide.polyether block copolymer as the lining resin. In order to form a block copolymer having excellent properties, it is advisable that prior to the substantial lactam polymerization, at least 90 mol %, more preferably at least 95 mol % of the amino groups of the polyamine are converted to lactam terminal groups. To do so, the initiator may be preliminarily formed, or the initiator may be formed prior to bringing the system under the lactam polymerization condition.

The lactam polymerization initiator of the present invention also includes initiators represented by the following formulae:

wherein Z is a polypropylene oxide polyol, t is at least 1, and Q, A, m, n and p are as defined above.

This initiator can be produced by the reaction of an acyllactam monomer having acyl groups with a telechelic polypropylene oxide polyol. In order to obtain a block copolymer having excellent properties, it is advisable that prior to the substantial lactam polymerization, at least 90 mol %, more preferably at least 95 mol % of the hydroxyl groups of the polypropylene oxide polyol, are converted to lactam terminal groups. To do so, the initiator may preliminarily be formed, or the initiator may be formed prior to bringing the system under the lactam polymerization condition.

The number average molecular weight of the lactam polymerization initiator is advantageously from about 500 to about 15,000, preferably from about 1,000 to about 10,000. A preferred lactam polymerization initiator is produced from a polyether polyamine and a polyhydrocarbon polyamine and has a molecular weight of at least about 1,000, preferably from about 2,000 to about 6,000. Here, the molecular weight means a number average molecular weight measured by a method commonly known in this technical field, unless otherwise specified.

The initiator of the present invention can be obtained by conducting the following steps sequentially at an ambient temperature.

a) a step of complexing acid halide groups of a polyfunctional acid halide with a tertiary amine;

b) a step of reacting at least one but not all of the complexed acid halide groups with a lactam monomer of the formula:

wherein Y is a $C_3$-$C_{11}$ alkylene group, to substitute the halogen with a lactam residue, thereby to form a halogenated ammonium salt;

c) a step of reacting at least 90 mol % of the rest of the complexed acid halide groups with a polyfunctional primary amine to form amide groups; and d) a step of removing the halogenated ammonium salt.

It is advantageous that the acid halide groups are present stoichiometrically slightly in excess relative to the amino groups. In this method, the acid halide groups react with amino groups of a polyamine to form amide bonds and a substituted halogenated ammonium by-product. An example of this reaction is as follows:

(lactam polymerization initiator) + $(HXNR_3)$

In the above formula, X is chlorine or bromine; $:NR_3$ is a tertiary amine; Z, Q, A and m are as defined above; and $K \geq dx$.

In some cases, the polyfunctional acid halide may contain more than one acid halide groups even after the reaction with the lactam monomer in step b) to form an initiator. In such cases, the polyfunctional acid halide is capable of coupling two or more telechelic polyamines or telechelic polypropylene oxide polyols by removing two or more substituted halogenated ammonium molecules per one coupling reaction.

This initiator may advantageously be formed in the presence of a pollution-free solvent such as cyclohexane, toluene, tetrahydrofuran or acetone.

Depending upon the nature of the solvent used, this initiator can be formed at an elevated temperature, for example, at a temperature of from 30° to 150° C. When a solvent is employed, such a solvent can be removed by distillation after the formation of the initiator.

The telechelic polyamine or the telechelic polypropylene oxide polyol advantageously has a number average molecular weight of from 300 to 10,000, preferably at least about 500, more preferably at least 1,000. The polylactam segments formed by the addition polymerization of a lactam monomer to the initiator, present hard and crystalline segments. Whereas this telechelic polyamine or the telechelic polypropylene oxide polyol is selected so as to present backbones of soft and elastomeric segments to a nylon block copolymer.

The soft segments when incorporated in a nylon block copolymer, contribute to bring the glass transition temperature Tg to a level of at most about 0° C., preferably at most about $-25°$ C. The glass transition temperature can readily be measured by a differential scanning calorimeter under a nitrogen atmosphere at a scanning speed of from 10° to 20° C./min.

Such segments are advantageously derived from a telechelic polypropylene oxide polyol or a telechelic polyamine selected from the group consisting of a polyoxyalkylene polyamine, an oxyalkylene copolymer polyamine, a polyalkadiene polyamine, an alkadiene copolymer polyamine, a polyalkene polyamine, an alkene copolymer polyamine and a combination thereof.

The amount of the elastomeric segments in the nylon block copolymer produced by the method of the present invention, varies depending upon the desired properties, and it is usually varied within the range of from 10 to 90% by weight of the copolymer.

Examples of a suitable polymer-type hydrocarbon polyamine include a polybutadiene diamine, a polybutadiene polyamine and a butadiene acrylonitrile copolymer polyamine.

Examples of a suitable polyether polyamine include a poly(oxybutylene)diamine, a poly(oxyethylene)diamine, a poly(oxypropylene)diamine, a poly(oxypropylene)triamine, a poly(oxypropylene)tetramine and a combination thereof, for example, a block copolymer of a poly(oxyethylene) and a poly(oxypropylene), modified with at least two amino groups. A preferred polyether polyamine is a poly(oxypropylene)triamine having a number average molecular weight of at least about 5,000.

A telechelic polyamine can be formed from a telechelic polyol by substituting the hydroxyl group of the telechelic polyol with an amino group in accordance with the method disclosed in U.S. Pat. Nos. 3,155,728 and 3,236,896. Depending upon the method for forming such a compound, it is considered that there remains a certain amount of the residual hydroxyl groups. As another method, a nitrile-containing polymer can be converted to amine-functional by reducing the nitrile group. Otherwise, a formyl-containing polymer may be converted to amine-functional by reduction amination of its formyl group.

The polyfunctional acid halides which can suitably be used for the preparation of the lactam polymerization initiators, are represented by the following formulas:

wherein, m is 0 or 1; when m is 0, n is 0 or 1, and p=1; when m is 1, n is within a range of from 1 to 3, and p=n; X is chlorine or bromine; A is an aliphatic or aromatic hydrocarbyl group or hydrocarbyl ether group; and $R_1$ is an alkyl group, an aralkyl group, an alkyloxy group, an aryloxy group, a halogen atom or an aralkyloxy group.

A is preferably a p-phenylene group, a m-phenylene group or $-(CH_2)_x-$ (wherein x is within a range of from 3 to 8), more preferably a p-phenylene group, a m-phenylene group or a mixture thereof, which brings about a nylon block copolymer having superior physical properties. Other preferred diacid halides contain an oxalyl group where m=0 and n=1.

A lactam suitable for the reaction with the complexed acid halide is the one having a $C_3$–$C_{11}$ alkylene group, preferably the one having a $C_3$ or $C_5$ alkylene group i.e. 2-pyrrolidinone or ε-caprolactam, in view of the reactivity and easy availability.

The tertiary amine useful for complexing the polyfunctional acid halide includes, for example, a trialkylamine, pyridine, an alkyl-substituted pyridine, quinoline and other substituted amines having substituents which do not substantially hinder the function of the amine as the complexing agent and the formation of the lactam polymerization initiator. The ammonium salt and any excessive tertiary amine are preferably removed after the formation of the initiator.

The lactam polymerization initiator is preferably prepared by reacting one equivalent of a telechelic polyamine based on the number of amino groups or a telechelic polypropylene oxide polyol based on the number of hydroxyl groups with one equivalent of the acid halides based on the number of acid halide groups. However, when a polymer-type lactam polymerization initiator having a backbone containing hard segments and soft segments alternately is desired, the polyfunctional acid halide is reacted to bond with two or more telechelic polyamines or telechelic polypropylene oxide polyols. In such a case, the equivalent ratio of each telechelic polyamine or telechelic polypropylene oxide polyol to the acid halide is selected to be smaller than 1:1. For example, when the telechelic polyamine or telechelic polypropylene oxide polyol is trifunctional, and a bifunctional acid halide is added for coupling with two polyamines or polypropylene oxide polyols, it is advantageous to employ an equivalent ratio of 1:3 in order to obtain a polymer-type tetrafunctional initiator. The above description of the soft segments preferably follows the general description of the molecular weight discussed above with respect to the telechelic polyamine or the telechelic polypropylene oxide polyol.

The lactam polymerization initiator is reacted with a lactam monomer, preferably ε-caprolactam, in the presence of a lactam polymerization catalyst, to form a nylon block copolymer having soft segments and hard segments. The hard segment is represented by the formula:

wherein q is from about 4 to about 300, and Y is as defined above, and the hard segment and the soft segment are linked by an amide linkage of the formula:

wherein A, Y, m n and p are as defined above.

This block copolymer contains no ester linkage between the hard segment and the soft segment, and is superior in the stability against hydrolysis and against heat to the one containing such an ester linkage.

The weight average molecular weigh of the nylon block copolymer thereby obtained, can be changed within a wide range, but is preferably within a range of from about 18,000 to about 100,000. The molecular weight usually depends upon the molar ratio of the lactam monomer and the lactam polymerization initiator.

The concentration of the initiator or the concentration of activated N-lactam groups supplied from the lactam polymerization initiator and present during the polymerization of the lactam monomer, influences the overall reaction rate. The total amount of the activated N-lactam groups i.e. the equivalent amount of the initiator, may change depending upon the functionality and-/or the concentration of the initiator present in the mixture. In general, the functionality of the initiator or the number of the activated N-lactam groups per molecule, is at least 2, preferably from about 2 to about 10, more preferably from about 3 to about 6. The lactam polymerization initiator is used usually in an amount of at least 0.1 mol %, preferably from 0.25 to 1.0 mol %, based on the total mol amount of the caprolactam monomer used.

When a nylon-6 block copolymer is produced by reacting the lactam polymerization initiator with a ε-caprolactam monomer in the presence of a suitable catalyst, the resulting block copolymer is usually the one having a polyamide chain having repeating units of the formula:

added to the lactam polymerization initiator. The nylon-6 block copolymer is produced essentially from a ε-caprolactam. However, it may contain other lactam monomers, so long as the reaction rate for the caprolactam polymerization or the degree of the polymerization is not substantially adversely affected.

Other Blending Materials

Further, in the present invention, other additives such as a plasticizer, a foaming agent, a dyestuff or pigment, an antioxidant and an internal releasing agent, may be incorporated so long as they do not substantially adversely affect the polymerization reaction.

Now, the present invention will be described in further detail with reference to Examples. However, it should be understood that the present invention is by no means restricted by such specific Examples.

In the following Examples, the evaluation of the outer appearance and the evaluation of the deterioration of the resin were conducted in the following manners.

Outer Appearance of the Sliding Coupling

A grease (Autolex A manufactured by Idemitsu Petrochemical Co., Ltd.) was injected into a clearance between the shaft and the bearing of a sliding coupling formed in each of the following Examples, and left to stand for 1,000 hours in an oven at 120° C. Then, the sliding operation of the shaft and the bearing was repeated 10,000 times. Then, the shaft was withdrawn from the bearing, and the resin lined on the bearing was visually inspected for any cracks formed in the resin. The evaluation was based on the following standards:
○: No crack formed
x: Cracks formed

Evaluation of the Deterioration of the Resin

From a flat molded product formed in each of the following Examples, 30 dumbbells of type IV according to ASTM D-638-72, were cut out. These test pieces were immersed in a prescribed grease (Autolex A, manufactured by Idemitsu Petrochemical Co., Ltd.). In this state, the test pieces were left to stand for 1,000 hours in an oven at 120° C. Thereafter, the tensile elongation was measured in accordance with ASTM D-638-72.

EXAMPLE 1

Figure 1:
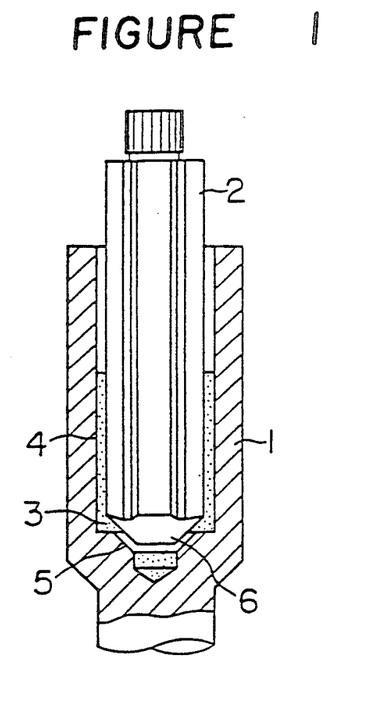
FIG. 1 is a cross sectional view showing a sliding coupling produced in an embodiment of the present invention.
Figure 2:
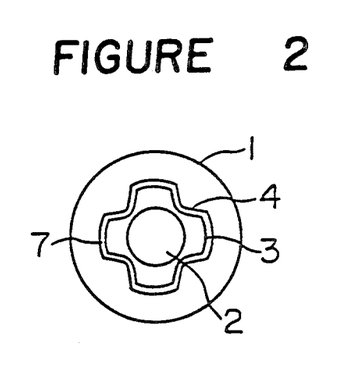
FIG. 2 is a plan view showing the sliding coupling of FIG. 1.

Referring to FIGS. 1 and 2, reference numeral 1 indicates an outer spline bearing, numeral 2 indicates an inner spline shaft fitted in and reciprocatively supported by the bearing 1, and numeral 3 indicates a resin lining made of a polyamide resin formed on the bearing surface 4 of the bearing 1. Numerals 5 and 6 indicate centers for alignment.

The sliding coupling of this Example was prepared in such a manner that firstly, a primer was applied to the bearing 1, and a releasing agent was applied to the shaft 2, then the bearing 1 and the shaft 2 were preheated and maintained at a temperature of from 130° to 160° C., and then the following casting materials (A) and (B) were mixed in equal amounts, injected into a clearance 7 (about 0.2 mm) between the bearing 1 and the shaft 2 and cured by polymerization at a temperature of from 130° to 160° C., to form a resin lining 3 on the bearing surface 4 of the bearing 1. With respect to the sliding coupling thus obtained, the outer appearance was evaluated after the deterioration operation.

Further, 90 g each of the following casting materials (A) and (B) were weighed, mixed and immediately injected into a mold for molding a flat plate with a cavity having a length of 220 mm, a width of 180 mm and a depth of 3 m controlled at a temperature of 140° C. by an electric heater and maintained at 140° C. for 5 minutes. With respect to the molded product, the evaluation of the deterioration of the resin was conducted.

| Molding material (A) | |
| --- | --- |
| ε-caprolactam | 291 g |
| Bromomagnesium caprolactam | 84 g |
| Casting material (B) | |
| ε-caprolactam | 167 g |
| Polymerization initiator having the | 167 g |

-continued following chemical structure wherein Z is a polypropylene oxide having a molecular weight of about 5,000.

The outer appearance of the sliding coupling and the results of the evaluation of the deterioration of the resin are shown in Table 1.

EXAMPLE 2

The resin lining of the bearing was conducted in the same manner as in Example 1 except that the following material was used as the polymerization initiator contained in the casting material (B).

wherein Z is a polypropylene oxide having a molecular weight of about 5,000.

The outer appearance of the sliding coupling and the results of the evaluation of the deterioration of the resin are shown in Table 1.

EXAMPLE 3

The resin lining of the bearing was conducted in the same manner as in Example 1 except that the following material was used as the polymerization initiator contained in the casting material (B).

wherein Z is a polypropylene oxide having a molecular weight of about 5,000.

The outer appearance of the sliding coupling and the results of the evaluation of the deterioration of the resin are shown in Table 1.

EXAMPLE 4

The resin lining of the bearing was conducted in the same manner as in Example 1 except that the following material was used as the polymerization initiator contained in the casting material (B).

wherein Z is a polypropylene oxide having a molecular weight of about 5,000.

The outer appearance of the sliding coupling and the results of the evaluation of the deterioration of the resin are shown in Table 1.

COMPARATIVE EXAMPLE 1

The resin lining of the bearing was conducted in the same manner as in Example 1 except that the following material was used as the polymerization initiator contained in the casting material (B).

wherein Z is a block copolymer of polypropylene oxide and polyethylene oxide, having polyethylene oxide terminals and having a molecular weight of about 5,000.

The outer appearance of the sliding coupling and the results of the evaluation of the deterioration of the resin are shown in Table 1.

It is evident from Table 1 that when the resin lining of the bearing is conducted by using a casting material (B) with the polymerization initiator selected by the present invention, there will be no deterioration or breakage of the lining even when it is subjected to a sliding test at a high temperature for a long period of time, and there will be no physical deterioration of the resin itself.

TABLE 1

| | Outer appearance after 1000 hrs at 120° C. followed by the sliding test (10,000 times) | After 1000 hrs at 120° C. | |
|---|---|---|---|
| | | Elongation (%) | Retention (%) |
| Example 1 | ○ | 182 | 91 |
| Example 2 | ○ | 164 | 84 |
| Example 3 | ○ | 181 | 86 |
| Example 4 | ○ | 176 | 86 |
| Comparative Example 1 | x | 10 | 5 |

EXAMPLE 5

The resin lining of the bearing was conducted in the same manner as in Example 1 except that the following material was used as the polymerization initiator contained in the casting material (B).

wherein Z is a polypropylene oxide having a molecular weight of about 5,000.

The outer appearance of the sliding coupling and the results of the evaluation of the deterioration of the resin are shown in Table 2.

EXAMPLE 6

The resin lining of the bearing was conducted in the same manner as in Example 1 except that the following material was used as the polymerization initiator contained in the casting material (B).

wherein Z is a polypropylene oxide having a molecular weight of about 5,000.

The outer appearance of the sliding coupling and the results of the evaluation of the deterioration of the resin are shown in Table 2.

EXAMPLE 7

The resin lining of the bearing was conducted in the same manner as in Example 1 except that the following material was used as the polymerization initiator contained in the casting material (B).

wherein Z is a polypropylene oxide having a molecular weight of about 5,000.

The outer appearance of the sliding coupling and the results of the evaluation of the deterioration of the resin are shown in Table 2.

EXAMPLE 8

The resin lining of the bearing was conducted in the same manner as in Example 1 except that the following material was used as the polymerization initiator contained in the casting material (B).

wherein Z is a polypropylene oxide having a molecular weight of about 5,000.

The outer appearance of the sliding coupling and the results of the evaluation of the deterioration of the resin are shown in Table 2.

COMPARATIVE EXAMPLE 2

The resin lining of the bearing was conducted in the same manner as in Example 1 except that the following material was used as the polymerization initiator contained in the casting material (B).

wherein Z is a block copolymer of polypropylene oxide and polyethylene oxide, having polyethylene oxide terminals and having a molecular weight of about 5,000.

The outer appearance of the sliding coupling and the results of the evaluation of the deterioration of the resin are shown in Table 2.

It is evident from Table 2 that when the resin lining of a bearing was conducted by using a casting material (B) having a polymerization initiator selected by the present invention, there will be no deterioration or breakage of the lining even by a sliding test at a high temperature for a long period of time, and there will be no physical deterioration of the resin itself.

TABLE 2

| | Outer appearance after 240 hrs at 120° C. followed by the sliding test (10,000 times) | After 240 hrs at 120° C. | |
|---|---|---|---|
| | | Elongation (%) | Retention (%) |
| Example 5 | ○ | 154 | 77 |
| Example 6 | ○ | 140 | 72 |
| Example 7 | ○ | 155 | 74 |
| Example 8 | ○ | 140 | 70 |
| Comparative Example 2 | x | 25 | 12 |

As described in the foregoing, the sliding coupling obtained by the monomer molding method of the present invention is excellent in the grease resistance and is a sliding coupling with high precision free from loose fitting, as a characteristic of the conventional sliding couplings. Thus, the value of the present invention for industrial application is significant.

We claim:

1. A method for producing a sliding coupling, which comprises injecting a casting material comprising the following components (A) and (B) into a clearance between a bearing and a shaft fitted in and rotatably or reciprocatively supported by the bearing, wherein a primer is preliminarily applied to either the shaft or the bearing and a releasing agent is preliminarily applied to the other; followed by polymerization and curing to form a resin lining on the surface of the shaft or the bearing:

(A) a $\Omega$-lactam liquid containing a polymerization catalyst of an alkali metal or alkaline earth metal compound; and

(B) a $\Omega$-lactam liquid containing at least one polymerization initiator selected from the group consisting of a polyoxyalkylene, an oxyalkylene copolymer, a polyalkadiene, an alkadiene copolymer, a polyalkene and an alkene copolymer, each of which has at least two terminal groups selected from the group consisting of lactam terminal groups of the following formulae:

wherein Q is a lactam residue having a $C_3$-$C_{11}$ alkylene group, said lactam residue being bonded to C, P or S via its nitrogen atom; A is an aliphatic or aromatic hydrocarbon group, or a hydrocarbon group having an ether linkage; m is 0 or 1; when m is 0, n is 0 or 1, and p is 1; when m is 1, n is within a range of from 1 to 3, and p=n; $R_1$ is an alkyl group, an aralkyl group, an alkoxy group, an aryloxy group, a halogen atom or an aralkyloxy group; and $R_2$ is a hydrogen atom or an alkyl group; or at least one polymerization initiator selected from the group consisting of lactam initiators of the following formulae;

wherein Z is a polypropylene oxide polyol, t is at least 1, and Q, A, m, n and p are as defined above.

2. The method according to claim 1, wherein the polymerization initiator is used in an amount of from 0.25 to 1.0 mol % based on the total amount of the Ω-lactam.

3. The method according to claim 1, wherein the Ω-lactam is at least one member selected from the group consisting of γ-butyrolactam, δ-valerolactam, ε-caprolactam, Ω-enantholactam, Ω-capryllactam, Ω-undecanolactam and Ω-laurolactam.

4. The method according to claim 1, wherein the polymerization catalyst in the component (A) is at least one member selected from the group consisting of an alkali metal, an alkaline earth metal, their hydrides, oxides, hydroxides, carbonates, alkyl compounds, aryl compounds, alkoxides and Grignard compounds, and reaction products of such metals or metal compounds with a Ω-lactam.

5. The method according to claim 1, wherein the polymerization catalyst is used in an amount of from 0.01 to 15 mol %, relative to the total amount of the Ω-lactam.

6. The method according to claim 1, wherein the polymerization initiator in the component (B) is a lactam initiator of the formula:

wherein Z is a polyvalent group derived from a telechelic polyamine selected from the group consisting of a polyoxyalkylene polyamine, an oxyalkylene copolymer polyamine, a polyalkadiene polyamine, an alkadiene copolymer polyamine, a polyalkene polyamine, an alkene copolymer polyamine and a combination thereof; t is at least 1, and A, Q, m, n, $R_1$ and p are as defined above.

7. The method according to claim 1, wherein the lactam polymerization initiator has a number average molecular weight of from about 500 to about 15,000.

8. The method according to claim 1, wherein the lactam polymerization initiator is derived from a polyether polyamine and a polyhydrocarbon polyamine and has a number average molecular weight of at least about 1,000.

9. The method according to claim 1, wherein the polymerization initiator is used in an amount of at least 0.1 mol % based on the total amount of the Ω-lactam.

* * * * *

UNITED STATES PATENT AND TRADEMARK OFFICE
CERTIFICATE OF CORRECTION

PATENT NO. : 5,114,521

DATED : May 19, 1992

INVENTOR(S) : Yo Isegawa et al.

It is certified that error appears in the above-identified patent and that said Letters Patent is hereby corrected as shown below:

Title page, item (75):
The third inventor's name is incorrect, should be,

--Kimimasa Murayama--.

Signed and Sealed this

Sixth Day of July, 1993

Attest:

MICHAEL K. KIRK

Attesting Officer

Acting Commissioner of Patents and Trademarks